(12) United States Patent
Liu et al.

(10) Patent No.: US 9,749,605 B2
(45) Date of Patent: Aug. 29, 2017

(54) PROJECTION APPARATUS

(71) Applicant: Coretronic Corporation, Hsin-Chu (TW)

(72) Inventors: Jui-Ta Liu, Hsin-Chu (TW); Hsuan-Hsiang Fu, Hsin-Chu (TW); Chih-Hsiang Li, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 34 days.

(21) Appl. No.: 15/092,619

(22) Filed: Apr. 7, 2016

(65) Prior Publication Data
US 2017/0006269 A1 Jan. 5, 2017

(30) Foreign Application Priority Data

Jun. 30, 2015 (CN) .......................... 2015 1 0385423

(51) Int. Cl.
*H04N 5/64* (2006.01)
*H04N 9/31* (2006.01)

(52) U.S. Cl.
CPC ......... *H04N 9/3185* (2013.01); *H04N 9/3194* (2013.01)

(58) Field of Classification Search
USPC ....... 348/744, 745, 786, 813, 838, 840, 658, 348/569, 308, 333.1, 369, 376, 208.8, 348/211.9, 236, 180, 158, 136, 135; 345/1.1, 2.2, 9, 158, 625, 634, 657; 353/40, 67, 70
See application file for complete search history.

(56) References Cited

U.S. PATENT DOCUMENTS

| | | | | |
|---|---|---|---|---|
| 5,988,817 A | * | 11/1999 | Mizushima | G09F 19/18 352/133 |
| 8,322,863 B1 | * | 12/2012 | Cho | H04N 9/3194 353/70 |
| 2001/0013843 A1 | * | 8/2001 | Fujiwara | G06F 3/1423 345/1.2 |
| 2004/0156033 A1 | * | 8/2004 | Kanemitsu | G01C 3/10 356/3.01 |

(Continued)

FOREIGN PATENT DOCUMENTS

| | | |
|---|---|---|
| CN | 1488990 | 4/2004 |
| CN | 100370816 | 2/2008 |
| CN | 101656859 | 10/2012 |

*Primary Examiner* — Jefferey F Harold
*Assistant Examiner* — Mustafizur Rahman
(74) *Attorney, Agent, or Firm* — Jianq Chyun IP Office

(57) ABSTRACT

A projection apparatus is provided, which includes a projector body, a first ultrasonic sensor and a second ultrasonic sensor. The projection apparatus is configured to project an image onto a screen. The first ultrasonic sensor and the second ultrasonic sensor are disposed on the projector body. The first ultrasonic sensor and the second ultrasonic sensor are respectively configured to measure a distance between the projector body and the screen. The projector body corrects the image in a horizontal direction through the first ultrasonic sensor and the second ultrasonic according to the measured distances. The first ultrasonic sensor and the second ultrasonic sensor are disposed on a first reference line corresponding to the first direction. The projection apparatus of the invention may provide good image quality.

13 Claims, 5 Drawing Sheets

(56) References Cited

U.S. PATENT DOCUMENTS

| | | | | |
|---|---|---|---|---|
| 2005/0237188 A1* | 10/2005 | Tani | ................... | A47L 11/4011 |
| | | | | 340/541 |
| 2005/0270496 A1* | 12/2005 | Mochizuki | ........... | G03B 21/132 |
| | | | | 353/70 |
| 2008/0100805 A1* | 5/2008 | Majumder | ............. | G03B 21/26 |
| | | | | 353/30 |
| 2008/0218644 A1* | 9/2008 | Matsumoto | ............ | G03B 21/28 |
| | | | | 349/8 |
| 2010/0182234 A1* | 7/2010 | Takahashi | ............. | G03B 21/14 |
| | | | | 345/157 |
| 2011/0292080 A1* | 12/2011 | Oka | ..................... | H04N 9/3179 |
| | | | | 345/634 |
| 2012/0050239 A1* | 3/2012 | Kasahara | ............... | G09G 5/003 |
| | | | | 345/204 |
| 2012/0214546 A1* | 8/2012 | Osaka | ................ | H04M 1/0272 |
| | | | | 455/556.1 |
| 2014/0078399 A1* | 3/2014 | Frouin | ................ | H01Q 25/005 |
| | | | | 348/516 |
| 2015/0077642 A1* | 3/2015 | Nishimura | ............. | G03B 21/10 |
| | | | | 348/745 |
| 2016/0003943 A1* | 1/2016 | Nakano | ................ | G08G 1/166 |
| | | | | 701/301 |

* cited by examiner

PROJECTION APPARATUS

CROSS-REFERENCE TO RELATED APPLICATION

This application claims the priority benefit of China application serial no. 201510385423.4, filed on Jun. 30, 2015. The entirety of the above-mentioned patent application is hereby incorporated by reference herein and made a part of this specification.

BACKGROUND OF THE INVENTION

Field of the Invention

The invention relates to an image display apparatus, and particularly relates to a projection apparatus.

Description of Related Art

In a general use, due to that a placing position and a placing angle of a projection apparatus do not right face to and parallel to a projection screen, a projection direction of the projection apparatus is probably not perpendicular to a horizontal direction or a vertical direction of the projection screen, which may influence display quality of a projection image to cause a keystone distortion of the projection image. In a conventional correction method, a camera module is used to capture the projection image for image analyzing, and then the projection image is corrected in a manual or automatic adjusting manner. However, such correction method generally requires to capture a plurality of projection images, so that a correction speed of the projection apparatus is very slow, and the correction process is liable to be influenced by an ambient environmental light to cause correction failure or a correction error. Therefore, the projection apparatus cannot provide good image quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projection apparatus capable of performing image correction to image.

Other objects and advantages of the invention can be further illustrated by the technical features broadly embodied and described as follows.

In order to achieve one or a portion of or all of the objects or other objects, an embodiment of the invention provides a projection apparatus. The projection apparatus includes a projector body, a first ultrasonic sensor and a second ultrasonic sensor. The projector body is configured to project an image onto a screen. The first ultrasonic sensor and the second ultrasonic sensor are disposed on the projector body. The first ultrasonic sensor and the second ultrasonic sensor are respectively configured to measure a distance between the projector body and the screen. The projector body corrects the image in a first direction according to the distances measured by the first ultrasonic sensor and the second ultrasonic sensor. The first ultrasonic sensor and the second ultrasonic sensor are disposed on a first reference line corresponding to the first direction.

According to the above description, the embodiments of the invention have at least one of the following advantages or effects. In an exemplary embodiment of the invention, the projection apparatus uses a plurality of ultrasonic sensors to measure the distances between the projector body and the screen, so as to implement an image correction.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

A first direction and a second direction mentioned in the following exemplary embodiments and the accompanying drawings can be respectively regarded as a horizontal direction and a vertical direction, though the first direction and the second direction of the invention are not limited thereto.

Figure 1:
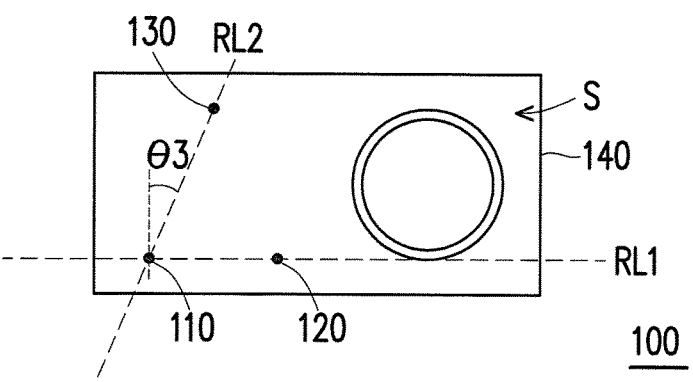
FIG. 1 and FIG. 2 are front views of a projection apparatus according to an embodiment of the invention.
Figure 2:
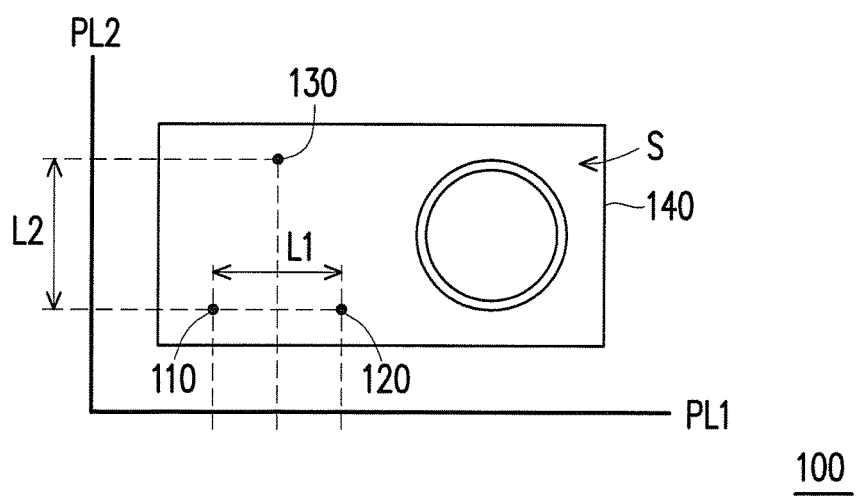
Figure 5:
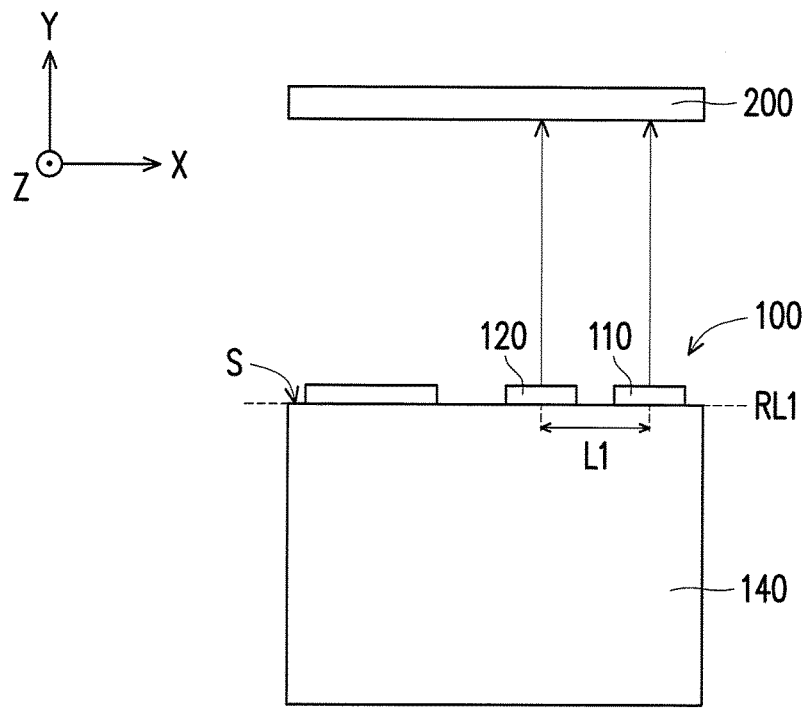
FIG. 5 and FIG. 6 are respectively top views of a projection apparatus and a screen in a first operation situation and a second operation situation according to an embodiment of the invention.

FIG. 1 and FIG. 2 are front views of a projection apparatus according to an embodiment of the invention. Referring to FIG. 1 and FIG. 2, the projection apparatus 100 of the embodiment includes a projector body 140, a first ultrasonic sensor 110, a second ultrasonic sensor 120 and a third ultrasonic sensor 130, and the first ultrasonic sensor 110, the second ultrasonic sensor 120 and the third ultrasonic sensor 130 are, for example, disposed on a surface S of the projector body 140. As shown in FIG. 5, the surface S is a surface of the projector body 140 facing a screen 200 when the projection apparatus 100 projects an image onto the screen 200. In the embodiment, the first ultrasonic sensor 110 and the second ultrasonic sensor 120 are disposed on a first reference line RL1, and a space there between is, for example, L1, where the first reference line RL1 is parallel to a first direction X. The third ultrasonic sensor 130 and one of the first ultrasonic sensor 110 and the second ultrasonic sensor 120 are disposed on a second reference line RL2.

In the embodiment, FIG. 1 illustrates a situation that the third ultrasonic sensor 130 and the first ultrasonic sensor 110 are disposed on the second reference line RL2, though the invention is not limited thereto. According to another aspect, the third ultrasonic sensor 130 and the second ultrasonic sensor 120 are disposed on another reference line (not shown).

In the embodiment, as shown in FIG. 1, the second reference line RL2 and a second direction Z have an included angle θ3 therebetween, and the second direction Z is perpendicular to the first direction X. The third ultrasonic sensor 130 can be disposed at any place on the surface S except for the first reference line RL1, so that the included angle θ3 between the second reference line RL2 and the second direction Z can be an acute angle, a right angle or an obtuse angle. A configuration position of the third ultrasonic sensor 130 is not limited to the position shown in FIG. 1.

In the embodiment, as shown in FIG. 1, the first ultrasonic sensor 110, the second ultrasonic sensor 120 and the third ultrasonic sensor 130 are disposed on the surface S of the projector body 140, though the invention is not limited thereto. In other embodiments, the first ultrasonic sensor 110, the second ultrasonic sensor 120 and the third ultrasonic sensor 130 can also be embedded inside the projector body 140, and perform ultrasonic sensing through corresponding through holes (not shown) set on the projector body, which is not limited by the invention.

Then, referring to FIG. 2, in the embodiment, the first ultrasonic sensor 110, the second ultrasonic sensor 120 and the third ultrasonic sensor 130 respectively correspond to a plurality of projection positions on a projection line PL1 of the first direction X and a projection line PL2 of the second direction Z. On the projection line PL1 of the first direction X, the projection position of the third ultrasonic sensor 130 is located between the projection position of the first ultrasound sensor 110 and the projection position of the second ultrasound sensor 120, and a space between the projection position of the first ultrasound sensor 110 and the projection position of the second ultrasound sensor 120 on the projection line PL1 is L1. In the embodiment, on the projection line PL2 of the second direction Z, the projection positions of the first ultrasonic sensor 110 and the second ultrasonic sensor 120 are the same, the projection position of the third ultrasonic sensor 130 is different from the projection positions of the first ultrasonic sensor 110 and the second ultrasonic sensor 120, and a space between the projection position of the first ultrasonic sensor 110 and the projection position of the third ultrasonic sensor 130 on the projection line PL2 is L2. The relationship between the projection positions of the ultrasonic sensors is changed as the configuration positions of the ultrasonic sensors are changed, which is not limited by the invention.

Figure 3:
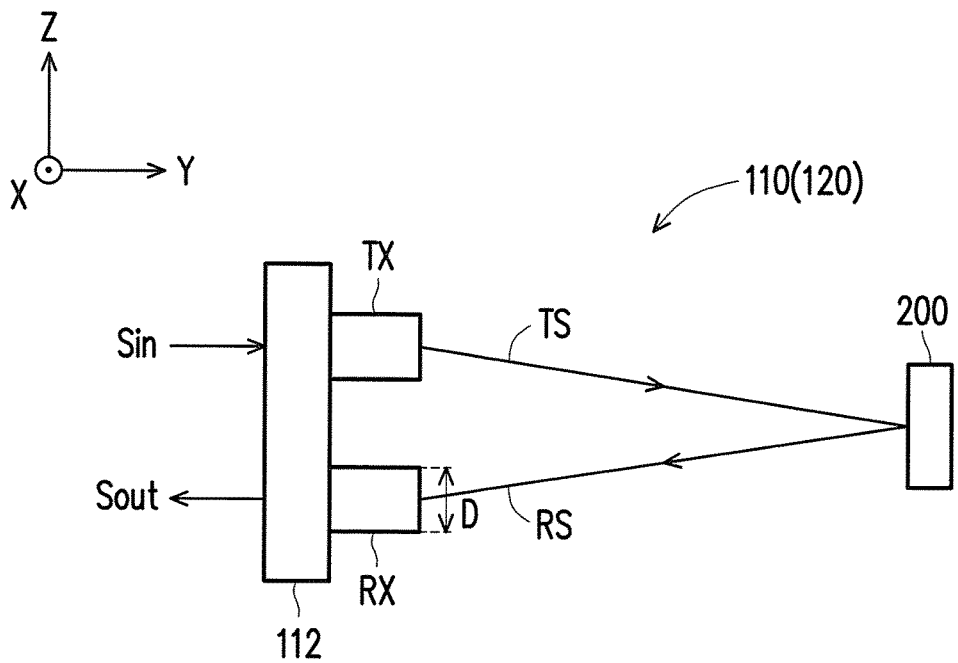
FIG. 3 is a schematic diagram of an ultrasonic sensor of the embodiment of FIG. 1.
Figure 4:
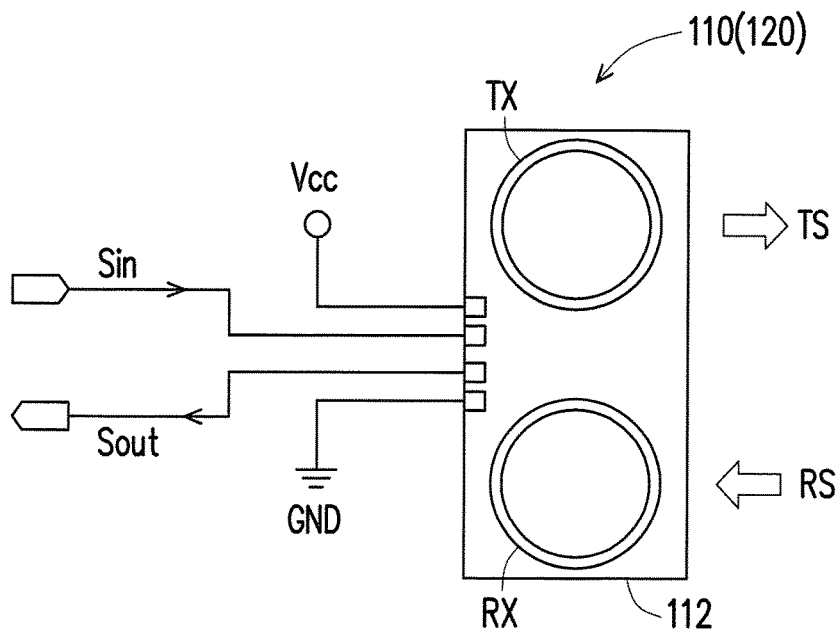
FIG. 4 is a schematic circuit diagram of the ultrasonic sensor of the embodiment of FIG. 3.

FIG. 3 is a schematic diagram of the ultrasonic sensor of the embodiment of FIG. 1. FIG. 4 is a schematic circuit diagram of the ultrasonic sensor of the embodiment of FIG. 3. Referring to FIG. 1, FIG. 2, FIG. 3 and FIG. 4, the ultrasonic sensor illustrated in FIG. 3 and FIG. 4 is, for example, the first ultrasonic sensor 110, the second ultrasonic sensor 120 or the third ultrasonic sensor 130. Taking the first ultrasonic sensor 110 as an example, the first ultrasonic sensor 110 includes an ultrasonic transmitter TX and an ultrasonic receiver RX, and the ultrasonic transmitter TX and the ultrasonic receiver RX are all disposed on a substrate 112 of the first ultrasonic sensor 110. In the embodiment, the space L1 between the first ultrasonic sensor 110 and the second ultrasonic sensor 120 on the first reference line RL1 is greater than a receiving range D of the first ultrasonic sensor 110.

In the embodiment, the first ultrasonic sensor 110 is, for example, biased in a range of a system voltage Vcc to a ground voltage GND. The ultrasonic transmitter TX is driven by a signal $S_{in}$ to send an ultrasonic transmitting signal TS to the screen 200. The ultrasonic receiver RX is configured to receive an ultrasonic reflecting signal RS reflected by the screen 200, and transmits a corresponding detection result $S_{out}$ to a processing unit (not shown) disposed in the projection apparatus 100. In the embodiment, the processing unit of the projection apparatus 100 may calculate a distance between the configuration position of the projector body 140 and the screen 200 according to a transmitting time of the ultrasonic transmitting signal TS and a receiving time of the ultrasonic reflecting signal RS.

Moreover, since those skilled in the art may learn enough instructions and recommendations for the operation methods of the second ultrasonic sensor 120 and the third ultrasonic sensor 130 of the embodiment of FIG. 1 and FIG. 2 from the description of the embodiment of FIG. 3 and FIG. 4, detailed description thereof is not repeated. Moreover, description of the ultrasonic sensor disclosed in FIG. 3 and FIG. 4 is only a schematic description of a general operation principle, and the ultrasonic sensor of the invention is not limited thereto, and in other embodiments, other ultrasonic sensors capable of measuring distance can also be adopted.

Figure 6:
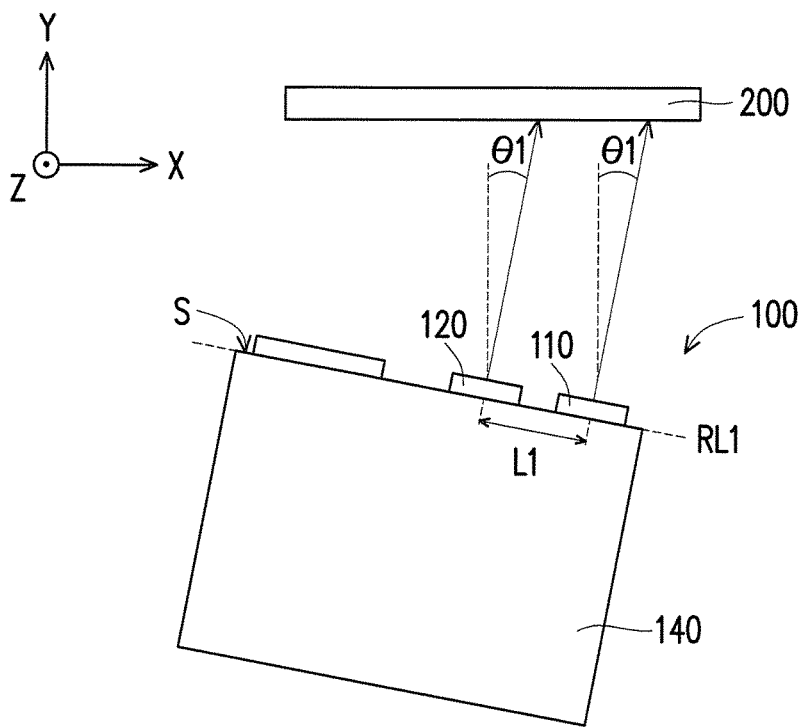

FIG. 5 and FIG. 6 are respectively top views of the projection apparatus and the screen in a first operation situation and a second operation situation according to an embodiment of the invention. Referring to FIG. 1, FIG. 5 and FIG. 6, in the embodiment, the projection apparatus 100, for example, projects an image to the screen 200 located in the front. In the first operation situation, the projection apparatus 100 is not inclined relative to the screen 200 along the first direction X. The distances measured by the first ultrasonic sensor 110 and the second ultrasonic sensor 120 are the same, and the first reference line RL1 and the screen 200 are all parallel to the first direction X, as shown in FIG. 5.

In the second operation situation, the projection apparatus 100 is, for example, inclined relative to the screen 200 by a first offset angle θ1 along the first direction X. Therefore, the distances measured by the first ultrasonic sensor 110 and the second ultrasonic sensor 120 are different, as shown in FIG. 6. In the second operation situation, since the projection apparatus 100 is inclined relative to the screen 200 by the first offset angle θ1 along the first direction X, the image probably has a keystone distortion. Therefore, the projection apparatus 100 may automatically corrects the image projected to the screen 200. In the embodiment, the projection apparatus 100, for example, calculates the first offset angle θ1 and an offset distance of the projection apparatus 100 relative to the screen 200 along the first direction X according to the measured distance between the first ultrasonic sensor 110 and the screen 200, the measured distance between the second ultrasonic sensor 120 and the screen 200, and the space L1 between the first ultrasonic sensor 110 and the second ultrasonic sensor 120 on the first reference line RL1, so as to perform the image correction.

In the embodiment, the projection apparatus 100, for example, calculates the offset distance and the first offset angle θ1 according to the Pythagorean theorem and trigonometric function formulas. Then, the projection apparatus 100 automatically corrects the keystone distortion of the image in the first direction X according to the first offset angle θ1 and the offset distance serving as correction parameters.

Figure 7:
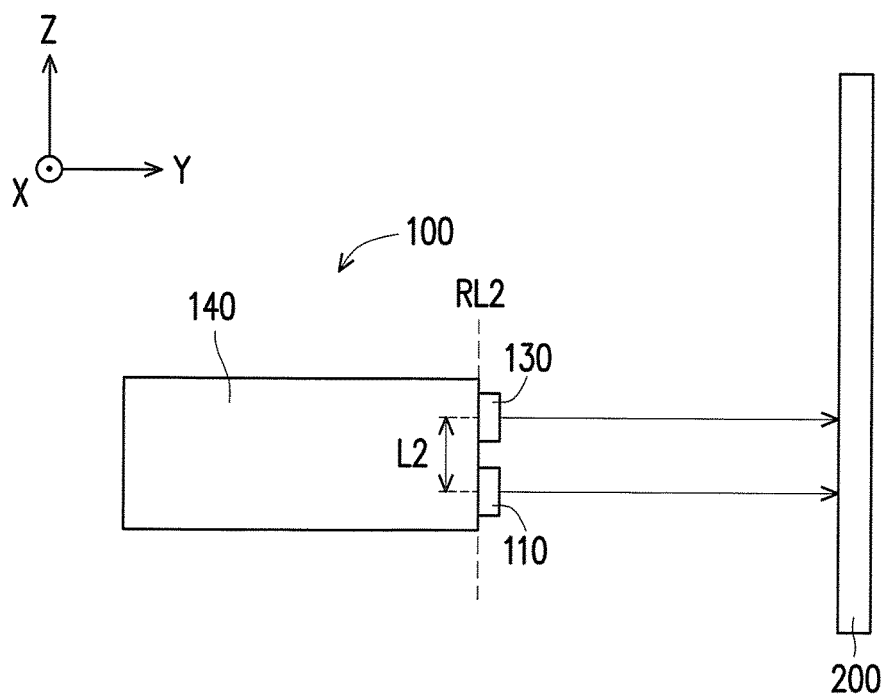
FIG. 7 and FIG. 8 are respectively side views of the projection apparatus and the screen of the embodiment of FIG. 5 and FIG. 6 in the first operation situation and the second operation situation.
Figure 8:
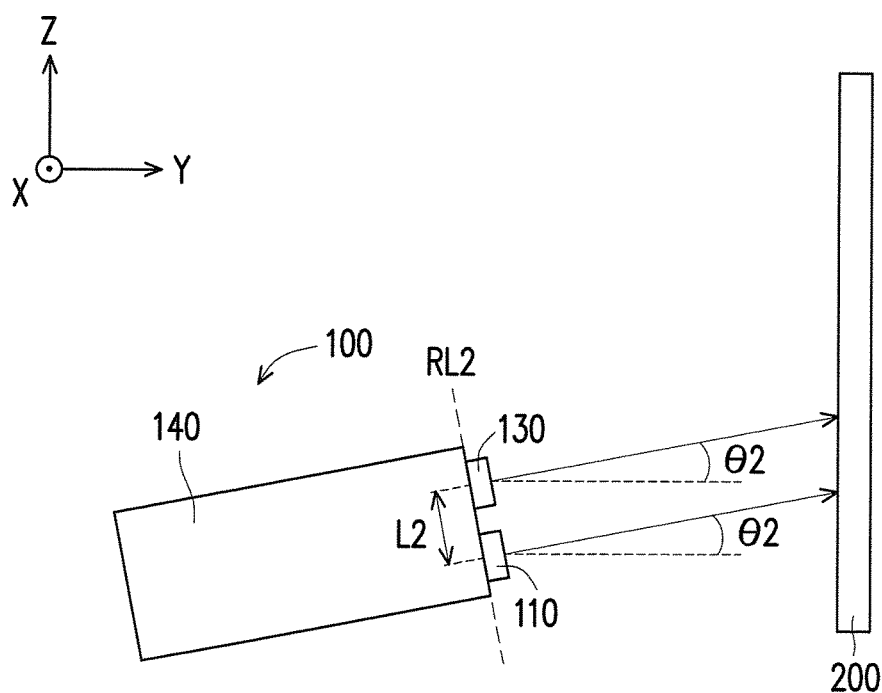

FIG. 7 and FIG. 8 are respectively side views of the projection apparatus and the screen of the embodiment of FIG. 5 and FIG. 6 in the first operation situation and the second operation situation. Referring to FIG. 1, FIG. 7 and FIG. 8, in the embodiment, in the first operation situation, the projection apparatus 100 is not inclined relative to the screen 200 along the second direction Z. The distance measured by the first ultrasonic sensor 110 and the distance measured by the third ultrasonic sensor 130 are the same, and the second reference line RL2 and the screen 200 are both parallel to the second direction Z, as shown in FIG. 7.

In the second operation situation, the projection apparatus 100 is, for example, inclined relative to the screen 200 by a second offset angle θ2 along the second direction Z. Therefore, the distances measured by the first ultrasonic sensor 110 and the third ultrasonic sensor 130 are different, as shown in FIG. 8. In the second operation situation, since the projection apparatus 100 is inclined relative to the screen 200 by the second offset angle θ2 along the second direction Z, the image probably has a keystone distortion. Therefore, the projection apparatus 100 may automatically corrects the image projected to the screen 200. In the embodiment, the projection apparatus 100, for example, calculates the second offset angle θ2 and an offset distance of the projection apparatus 100 relative to the screen 200 along the second direction Z according to the measured distance between the first ultrasonic sensor 110 and the screen 200, the measured distance between the third ultrasonic sensor 130 and the screen 200, and the space L2 (shown in FIG. 2) between the first ultrasonic sensor 110 and the third ultrasonic sensor 130 on the projection line PL2, so as to perform the image correction.

In the embodiment, the projection apparatus 100, for example, calculates the offset distance and the second offset angle θ2 according to the Pythagorean theorem and trigonometric function formulas. Then, the projection apparatus 100 automatically corrects the keystone distortion of the image in the second direction Y according to the second offset angle θ2 and the offset distance serving as correction parameters.

In the embodiment, although the projection apparatus 100 performs the image correction of the image in the second direction Z according to the distance measured by the first ultrasonic sensor 110 and the distance measured by the third ultrasonic sensor 130, the invention is not limited thereto. In an embodiment, the projection apparatus 100 may also corrects the image in the second direction Z according to the distance measured by the second ultrasonic sensor 120 and the distance measured by the third ultrasonic sensor 130, and since enough instructions and recommendations of the operation method thereof can be learned from the descriptions of FIG. 7 and FIG. 8, detailed description thereof is not repeated.

Figure 9:
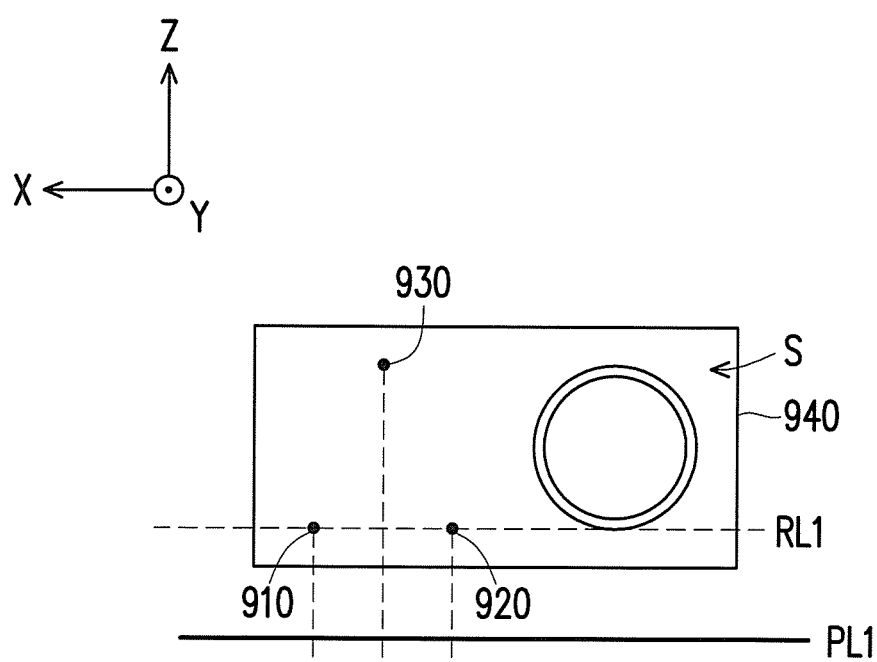
FIG. 9 is a front view of a projection apparatus according to another embodiment of the invention.

FIG. 9 is a front view of a projection apparatus according to another embodiment of the invention. Referring to FIG. 1 and FIG. 9, the projection apparatus 900 of the embodiment is similar to the projection apparatus 100 of the embodiment of FIG. 1, though a main difference therebetween is that the projection apparatus 900 automatically corrects the keystone distortion of the image in the second direction Z through a gravity sensor 930, and the second direction Z is a gravity direction.

To be specific, in the embodiment, the gravity sensor 930 is disposed on the projector body 940, and is configured to perform the correction of the image in second direction Z. In the embodiment, the gravity sensor 930 is, for example, disposed on the surface S of the projector body 940. In an embodiment, the gravity sensor 930 can also be embedded in the projector body 940, which is not limited by the invention. In the embodiment, since the operation method that the projection apparatus 900 automatically corrects the keystone distortion of the image in the second direction Z through the gravity sensor 930 is known by those skilled in the art, details thereof are not repeated.

On the other hand, in the present embodiment, the first ultrasonic sensor 910 and the second ultrasonic sensor 920 are disposed on the first reference line RL1, and the first ultrasonic sensor 910 and the second ultrasonic sensor 920 are respectively configured to measure a distance between the projection body 940 and the screen. In the embodiment, the projector body 940 performs the correction of the image in the first direction X according to the distances measured by the first ultrasonic sensor 910 and the second ultrasonic sensor 920, and since enough instructions and recommendations of the operation method thereof can be learned from the descriptions of FIG. 3 to FIG. 6, detailed description thereof is not repeated.

In summary, the embodiments of the invention have at least one of the following advantages or effects. In the projection apparatus of the invention, two ultrasonic sensors are disposed on the reference line of the first direction to respectively measure the distances between the projection apparatus and the screen. If the distances measured by the ultrasonic sensors are different, the projection apparatus performs the image correction of the projected image in the first direction. Then, in the projection apparatus of the invention, the third ultrasonic sensor and one of the first ultrasonic sensor and the second ultrasonic sensor can be disposed on another reference line corresponding to the second direction, so as to measure the distances between the projection apparatus and the screen. If the distances measured by the ultrasonic sensors are different, the projection apparatus performs the image correction of the projected image in the second direction. Moreover, in the projection apparatus of the invention, the gravity sensor can be disposed at any place of the projector body to detect an offset angle corresponding to the second direction, which also serves as a correction parameter for correcting the keystone distortion of the image in the second direction, and the second direction is the gravity direction. The projection apparatus of the invention has a faster correction speed compared with that of a conventional correction method, and is not liable to be influenced by an ambient environmental light during the correction process, such that the projection apparatus of the invention may provide good image quality.

The foregoing description of the preferred embodiments of the invention has been presented for purposes of illustration and description. It is not intended to be exhaustive or to limit the invention to the precise final or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   a projector body, configured to project an image onto a screen; and
   a first ultrasonic sensor and a second ultrasonic sensor, disposed on the projector body, and respectively configured to measure a distance between the projector body and the screen, wherein the projector body corrects the image in a first direction according to the distances measured by the first ultrasonic sensor and the second ultrasonic sensor,
   wherein the first ultrasonic sensor and the second ultrasonic sensor are disposed on a first reference line corresponding to the first direction, and
   wherein a space between the first ultrasonic sensor and the second ultrasonic sensor on the first reference line is greater than a receiving range of the first ultrasonic sensor and the second ultrasonic sensor.

2. The projection apparatus as claimed in claim 1, wherein when the distances are the same, the first reference line is parallel to the first direction, and when the distances are different, the projection body corrects the image in the first direction.

3. The projection apparatus as claimed in claim 1, wherein the projection body has a surface facing the screen, and the first ultrasonic sensor and the second ultrasonic sensor are disposed on the surface.

4. The projection apparatus as claimed in claim 1, wherein the first ultrasonic sensor and the second ultrasonic sensor are embedded inside the projector body.

5. The projection apparatus as claimed in claim 1, further comprising:
   a gravity sensor, disposed on the projector body, and configured to correct the image in a second direction.

6. A projection apparatus, comprising:
   a projector body, configured to project an image onto a screen;
   a first ultrasonic sensor and a second ultrasonic sensor, disposed on the projector body, and respectively configured to measure a distance between the projector body and the screen, wherein the projector body corrects the image in a first direction according to the distances measured by the first ultrasonic sensor and the second ultrasonic sensor, wherein the first ultrasonic sensor and the second ultrasonic sensor are disposed on a first reference line corresponding to the first direction; and
   a third ultrasonic sensor, disposed on the projector body, and configured to measure a distance between the projector body and the screen, wherein the projector body corrects the image in a second direction to the image according to the distance measured by the third ultrasonic sensor and the distance measured by at least one of the first ultrasonic sensor and the second ultrasonic sensor, and the third ultrasonic sensor and one of the first ultrasonic sensor and the second ultrasonic sensor are disposed on a second reference line corresponding to the second direction.

7. The projection apparatus as claimed in claim 6, wherein the first direction is substantially perpendicular to the second direction.

8. The projection apparatus as claimed in claim 6, wherein the second reference line and the second direction have an included angle therebetween.

9. The projection apparatus as claimed in claim 6, wherein the projection body has a surface facing the screen, and the first ultrasonic sensor, the second ultrasonic sensor and the third ultrasonic sensor are disposed on the surface.

10. The projection apparatus as claimed in claim 6, wherein the third ultrasonic sensor is embedded inside the projector body.

11. The projection apparatus as claimed in claim 6, wherein a projection position of the third ultrasonic sensor is located between a projection position of the first ultrasonic sensor and a projection position of the second ultrasonic sensor on a projection line of the first direction.

12. The projection apparatus as claimed in claim 6, wherein a projection position of the third ultrasonic sensor is different from a projection position of the first ultrasonic sensor and a projection position of the second ultrasonic sensor on a projection line of the second direction.

13. The projection apparatus as claimed in claim 6, wherein when the distance measured by the third ultrasonic sensor is the same to the distance measured by at least one of the first ultrasonic sensor and the second ultrasonic sensor, the second reference line is parallel to the second direction, and when the distance measured by the third ultrasonic sensor is different to the distance measured by at least one of the first ultrasonic sensor and the second ultrasonic sensor, the projection body corrects the image in the second direction.

* * * * *